July 7, 1959 — J. W. ARMOND — 2,893,512
PURIFICATION OF ARGON
Filed Aug. 26, 1957
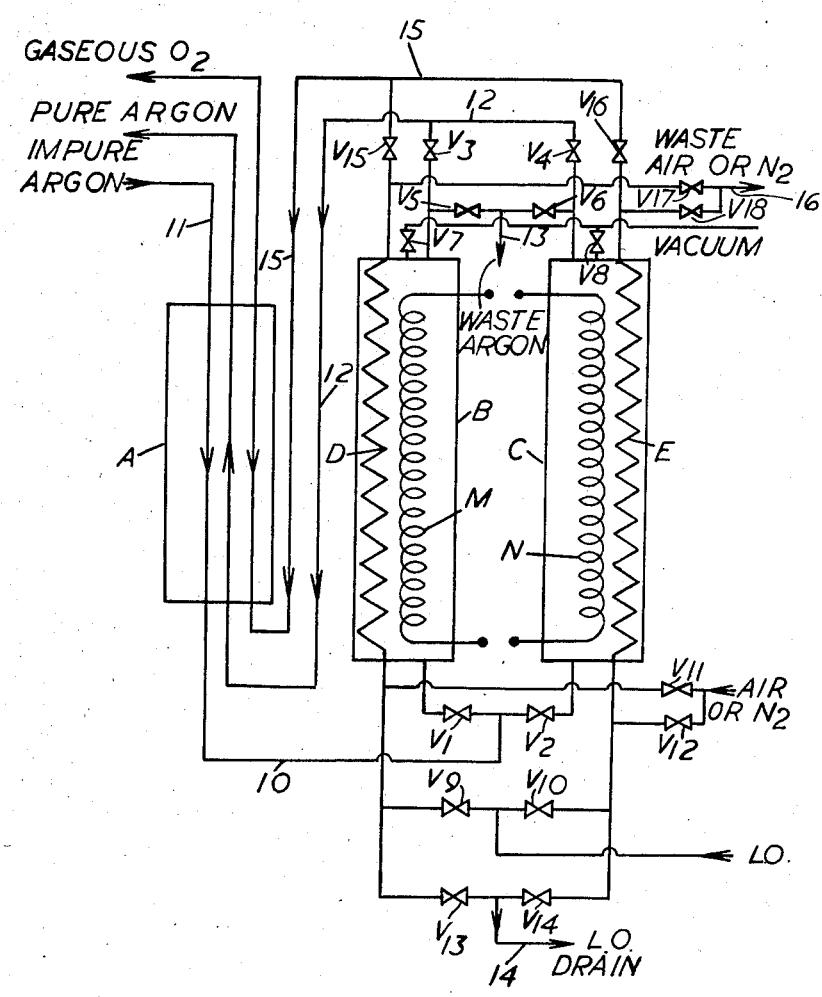
Inventor
JOHN WALTER ARMOND
By
Aaron R. Townshend, Attorney United States Patent Office 2,893,512
Patented July 7, 1959

2,893,512

PURIFICATION OF ARGON

John Walter Armond, Surrey, England, assignor to The British Oxygen Company Limited, a British company Application August 26, 1957, Serial No. 680,284

Claims priority, application Great Britain August 29, 1956

5 Claims. (Cl. 183—114.2)

This invention relates to the purification of argon and particularly to the substantial removal from admixture with argon in the gaseous phase of small quantities of nitrogen or methane or mixtures thereof.

It is known that small amounts of nitrogen can be removed from gaseous argon by adsorption by certain natural zeolites, such as chabazite and mordenite, which act as molecular sieves. Such zeolites are crystalline aluminosilicates, usually of the alkali and alkaline earth metals, and in the naturally occurring materials more than one of these metals occur in varying proportions. All crystalline zeolites have, running through the aluminosilicate network, channels or pores which are of molecular diameters at their narrowest point, that is of the order of 5 A. The water of crystallisation is located at sites in these channels through the crystal and may be removed by heating under vacuum. With certain zeolites, owing to their strong three-dimensional cross-linking, the crystal lattice is maintained to almost complete dehydration without collapse. The resultant porous structure containing the sites vacated by the water molecules has the property of accommodating inside the crystal lattice molecules of sufficiently small diameter to enter the pores of the material. They can thus act as molecular sieves, exhibiting very high sorptive capacities even at low partial pressures.

The zeolites of this type owe their ability to effect separation in the gas phase both to their pore size and to their chemical constitution. Separation may occur either by total molecular sieve action in which the larger molecular species present in the gas mixture is too big to enter the pores of the zeolite and remains unsorbed, or by partial molecular sieve action which depends upon a combination of the rates of diffusion of the two molecular species into the zeolite material, and the difference in the affinity of the material for the two species. As previously mentioned, not all zeolites are suitable for use in such separation since some, on dehydration, suffer a collapse of the aluminosilicate network with the loss of the intracrystalline pores. It is, in fact, only the members with a strong three-dimensional aluminosilicate network structure, which does not collapse on dehydration, which develop the molecular sieve properties.

The important difference between these materials and the conventional adsorbents such as active charcoal, silica gel and activated alumina, lies in the pore diameter which is considerably larger in the case of the conventional adsorbents than in that of the zeolites. An important distinctive property arising from this difference in the order of pore size is the shape of the sorptive isotherm obtained. The typical isotherm for zeolites is characterised by a high sorptive capacity at small sorbate partial pressure becoming almost constant long before saturation pressure is reached. With the conventional adsorbents, the sorptive capacity increases much more slowly with increasing adsorbate pressure. Thus, the molecular sieve type of zeolite shows a high sorptive capacity for low concentrations of sorbate, provided the molecular diameter is sufficiently small.

It is an object of the present invention to provide a method for the removal from argon of small quantities of nitrogen or methane or mixtures of these two gases, which employs an adsorptive material which is more efficient and more readily available than the naturally occurring zeolites hitherto used.

According to the present invention, a method of effecting the substantial removal of methane and/or nitrogen constituting as impurity up to 0.5% by weight of an impure argon comprises passing the impure argon through an adsorbent bed consisting of an activated artificial zeolite as hereinafter described.

A space velocity not substantially exceeding 1000 cc. per hour per cc. of adsorebnt bed is normally preferred but the use of higher space velocities is not precluded.

The artificial zeolites which can be used in the process of the present invention are as follows:

(1) *Zeolite A.*—A sodium calcium aluminum silicate material having a composition expressed in terms of oxides as follows:

$$1.0 \pm 0.2 M_{2/n}O : Al_2O_3 : 1.85 \pm 0.5 SiO_2 . YH_2O$$

wherein M is in part sodium and in part calcium, the percentage of calcium being 40% or more of the total metals, $n$ is the average valency of M calculated from the formula:

$$n = 2\frac{(\% \text{ Ca in M})}{100} + \frac{\% \text{ Na in M}}{100}$$

and Y is a number not above 6, the atoms of the material being arranged in a unit cell in such a manner that the X-ray diffraction pattern of the material shows at least the lines listed in Table A below.

TABLE A d Value of Reflection in A.

12.2±0.2
8.6±0.2
7.05±0.15
4.07±0.08
3.68±0.07
3.38±0.06
3.26±0.05
2.96±0.05
2.73±0.05
2.60±0.05

This zeolite may be prepared by first preparing a sodium aluminium silicate of the requisite composition by heating a mixture in aqueous solution of the right proportions of the oxides or of materials whose chemical compositions can be completely represented as mixtures of the oxides $NA_2O$, $Al_2O_3$, $SiO_2$ and $H_2O$, permitting the product to crystallise from solution, and thereafter replacing the required amount of sodium with calcium by ion exchange. The preparation and structure of this zeolite is set out in detail in British patent specification No. 777,232.

(2) *Zeolite X.*—A sodium aluminum silicate having a composition expressed in terms of oxides as follows:

$$0.9 \pm 0.2\ Na_2O : Al_2O_3 : 2.5 \pm 0.5\ SiO_2 YH_2O$$

where Y is a number not above 8, the atoms of the material being arranged in a unit cell in such a manner that the X-ray diffraction pattern of the material shows at least the lines listed in Table B below.

TABLE B

*d Value of Reflection in A.*

14.42±0.2
8.82±0.1
4.41±0.05
3.80±0.05
3.33±0.05
2.88±0.05
2.79±0.05
2.66±0.05

This zeolite may be prepared by heating a mixture in aqueous solution of the right proportions of the oxides or of materials whose chemical compositions can be completely represented as mixtures of the oxides, $Na_2O$, $Al_2O_3$, $SiO_2$ and $H_2O$, and permitting the product to crystallise from solution. The preparation and structure of this zeolite is described in detail in British patent specification No. 777,233.

The zeolite material is activated before use by heating under vacuum or in a stream of a dry purge gas which is not adsorbed by the material to drive off water and sorbed gases. The activated material is then cooled to the purification temperature and the impure argon passed through the bed. When the adsorbed material is saturated with the sorbed nitrogen and/or methane, it may be regenerated by a treatment similar to the initial activation, although if the gas mixture to be purified is dry, a lower temperature may be sufficient.

While any temperature at or below ambient temperature may be used for the adsorption, it is preferred to cool the bed to the boiling point of liquid oxygen, —183° C. When such low temperature is used, it is convenient to precool the impure argon prior to its passage through the bed by passing it in heat exchange relationship with purified gas leaving the adsorbed bed.

By the use of the method of the present invention, it has been found possible to reduce the impurity content of the argon from as much as 0.5% of either methane or nitrogen or both to about 5 parts per million or less.

The present invention will now be more particularly described with reference to the accompanying drawing which shows diagrammatically one form of apparatus according to the invention.

The apparatus comprises a three-phase heat exchanger A and two purification vessels B and C containing the zeolite, together with the requisite piping and valves. The vessels B and C are arranged to be used alternately, one vessel being used to purify the argon whilst the other is being regenerated. When the zeolite in the vessel in use is exhausted, the vessels are changed over.

The vessels B and C are connected at their lower ends through valves $V_1$ and $V_2$ respectively with a pipe 10 which is connected to the outlet of one phase of the heat exchanger A, the inlet to this phase being connected through a pipe 11 with the source of impure argon. The upper ends of the vessels B and C are connected through valves $V_3$ and $V_4$ with a pipe 12 leading to the inlet of a second phase of the heat exchanger A; through valves $V_5$ and $V_6$ with a withdrawal pipe 13 for waste argon; and through valves $V_7$ and $V_8$ with a source of vacuum.

Each of the vessels B and C is provided with a cooling coil, D and E respectively. The coils D and E are connected at their lower ends through valves $V_9$ and $V_{10}$ respectively to a supply of liquid oxygen; through valves $V_{11}$ and $V_{12}$ respectively with a source of air or nitrogen; and through valves $V_{13}$ and $V_{14}$ respectively with a drain 14 for liquid oxygen. The upper ends of the coils D and E are connected through valves $V_{15}$ and $V_{16}$ respectively with a pipe 15 leading to the inlet of the third phase of the heat exchanger A; and through valves $V_{17}$ and $V_{18}$ respectively with a withdrawal pipe 16 for waste air or nitrogen. The vessels B and C are also arranged to be heated by electrical heating coils M and N respectively embedded in the sorbent bed.

In operation, assuming vessel B to be in use for argon purification whilst vessel C is being regenerated, valves $V_2$, $V_4$, $V_5$, $V_7$, $V_{10}$, $V_{11}$, $V_{13}$, $V_{16}$, and $V_{17}$ will be closed. Impure argon at a pressure slightly above atmospheric (sufficient only to overcome the pressure drop through the heat exchanger A, sorbent vessel B, valves and piping) is passed through the pipe 11 to the heat exchanger A where it is cooled to approximately 90° K. by heat exchange with a stream of purified argon and a stream of gaseous oxygen passing through the heat exchanger in countercurrent flow to the impure argon as hereinafter described. The cooled impure argon then passes through the pipe 10 and valve $V_1$ into the vessel B, where the impurity is removed from the argon by the zeolite.

The purified argon leaves the vessel B through valve $V_3$ and pipe 12 and passes through the heat exchanger A in countercurrent flow to the incoming impure argon.

In order to provide refrigeration to compensate for heat inleak into the system, liquid oxygen at atmospheric pressure is passed through valve $V_9$ and cooling coil D in sufficient quantity to maintain the temperature in the vessel B at 90° K. or slightly above. During its passage through the coil D, the liquid oxygen is vaporised and the resultant gaseous oxygen passes through the valve $V_{15}$ into the pipe 15 and thence through the heat exchanger A in countercurrent flow to the incoming impure argon.

Considering now the vessel C which is being regenerated, this vessel is isolated from the argon and oxygen streams by the closure of valves $V_2$, $V_4$, $V_{10}$, and $V_{16}$. As soon as these valves are closed, any residual liquid oxygen in the coil E is drained away through the drain 14 by opening the valve $V_{14}$. At the same time, air or nitrogen is passed through the coil E by opening valves $V_{12}$ and $V_{18}$. The electrical heating coil N is then switched on. When the zeolite within the vessel C is at approximately ambient temperature, the flow of air or nitrogen through the coil E is stopped by closing valves $V_{12}$ and $V_{18}$ and the vessel C is evacuated to a pressure of about 1 mm. of mercury by opening valve $V_8$. When the selected regeneration temperature is reached, the heating coil N is switched off and cooling air or nitrogen passed through the coil E by re-opening valves $V_{12}$ and $V_{18}$. As the vessel cools, impure argon is admitted to it by opening valves $V_2$ and $V_6$ and closing valve $V_8$, so that the sorbent cools in an atmosphere of the argon. When the vessel has cooled to ambient temperature, it can be precooled by passing liquid oxygen through the coil E by opening valves $V_{10}$ and $V_{16}$, and then brought on stream by opening valves $V_2$ and $V_4$. The vessel B can then be isolated and regenerated in its turn.

The point at which changeover of vessels B and C becomes necessary may be determined by analysis of the pure argon stream leaving the plant.

It will be appreciated that the apparatus described above is only one form which may be used in carrying out the process of the present invention and that it may be modified in various ways. For example, the electrical heating coil may be wrapped around the outside of the sorbent vessel, or it may be eliminated completely and the sorbent heated by passing hot gas through the cooling coil. Again, the sorbent vessels may each consist of a series of tubes carrying the zeolite and immersed in a bath of liquid oxygen.

I claim:

1. The method of effecting the substantial removal of at least one gaseous impurity selected from the group consisting of methane and nitrogen constituting up to 0.5% by weight of an impure argon comprising passing the impure argon through an adsorbent bed consisting of a material selected from the group consisting of (a) a dehydrated crystalline sodium calcium aluminium silicate having a composition expressed in terms of oxides as follows:

$$1.0 \pm 0.2 \ M_{2/n}O : Al_2O_3 : 1.85 \pm 0.5 \ SiO_2 . YH_2O$$

wherein M is in part sodium and in part calcium, the percentage of calcium being at least 40% by weight of the total sodium and calcium, $n$ is the average valency of M (calculated from the formula:

$$n = 2 \left( \frac{\% \ Ca \ in \ M}{100} + \frac{\% \ Na \ in \ M}{100} \right)$$

and Y in the hydrated form is a number not above 6, the atoms of the material being arranged in a unit cell in such a manner that the X-ray diffraction pattern of the material shows at least the lines listed in Table A; and (b) a dehydrated crystalline sodium aluminium silicate having a composition expressed in terms of oxides as follows:

$$0.9 \pm 0.2 \ Na_2O : Al_2O_3 : 2.5 \pm 0.5 \ SiO_2 . YH_2O$$

wherein Y in the hydrated form is a number not above 8, the atoms of the material being arranged in a unit cell in such a manner that the X-ray diffraction pattern of the material shows at least the lines listed in Table B.

2. Method according to claim 1 wherein the impure argon is passed through the adsorbent bed at a space velocity not substantially exceeding 1000 cc. per hour per cc. of adsorbent bed.

3. Method according to claim 1 wherein the adsorbent bed is activated before use and re-activated on exhaustion by heating under vacuum.

4. Method according to claim 1 wherein the adsorption is effected at approximately the temperature of boiling oxygen at atmospheric pressure.

5. Method according to claim 4 including the step of precooling the impure argon prior to its passage through the adsorbent bed by heat exchange with purified argon leaving the adsorbent bed.

References Cited in the file of this patent

UNITED STATES PATENTS

| | | |
|---|---|---|
| 2,663,626 | Spangler | Dec. 22, 1953 |
| 2,810,454 | Jones et al. | Oct. 22, 1957 |